Figure 1:
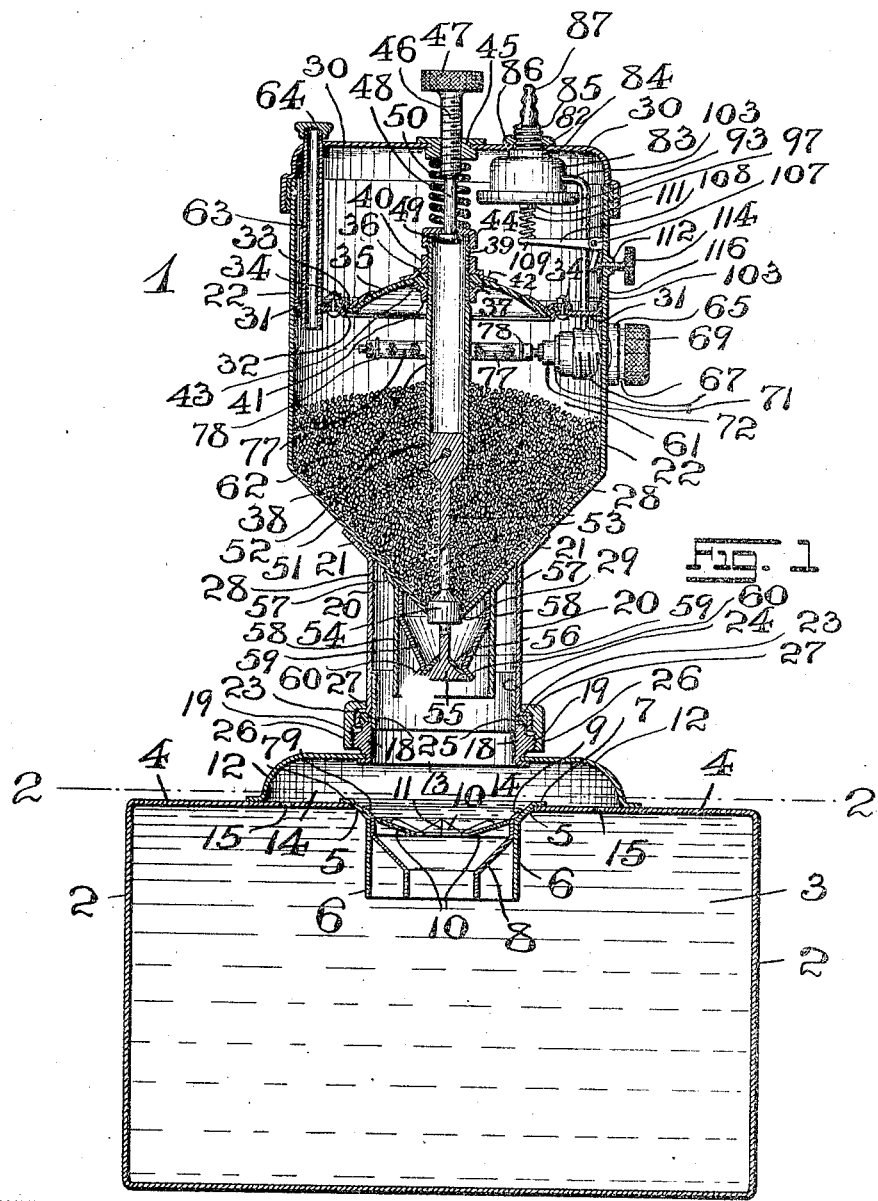

R. K. GRATIGNY.
ACETYLENE GAS GENERATOR.
APPLICATION FILED DEC. 18, 1909.

997,618.

Patented July 11, 1911.

2 SHEETS—SHEET 1.

WITNESSES:
Fredk H. W. Fraentzel
Anna H. Altel

INVENTOR:
Ralph K. Gratigny,
BY
Fraentzel and Richards
ATTORNEYS

R. K. GRATIGNY.
ACETYLENE GAS GENERATOR.
APPLICATION FILED DEC. 18, 1909.
997,618.
Patented July 11, 1911.
2 SHEETS—SHEET 2.
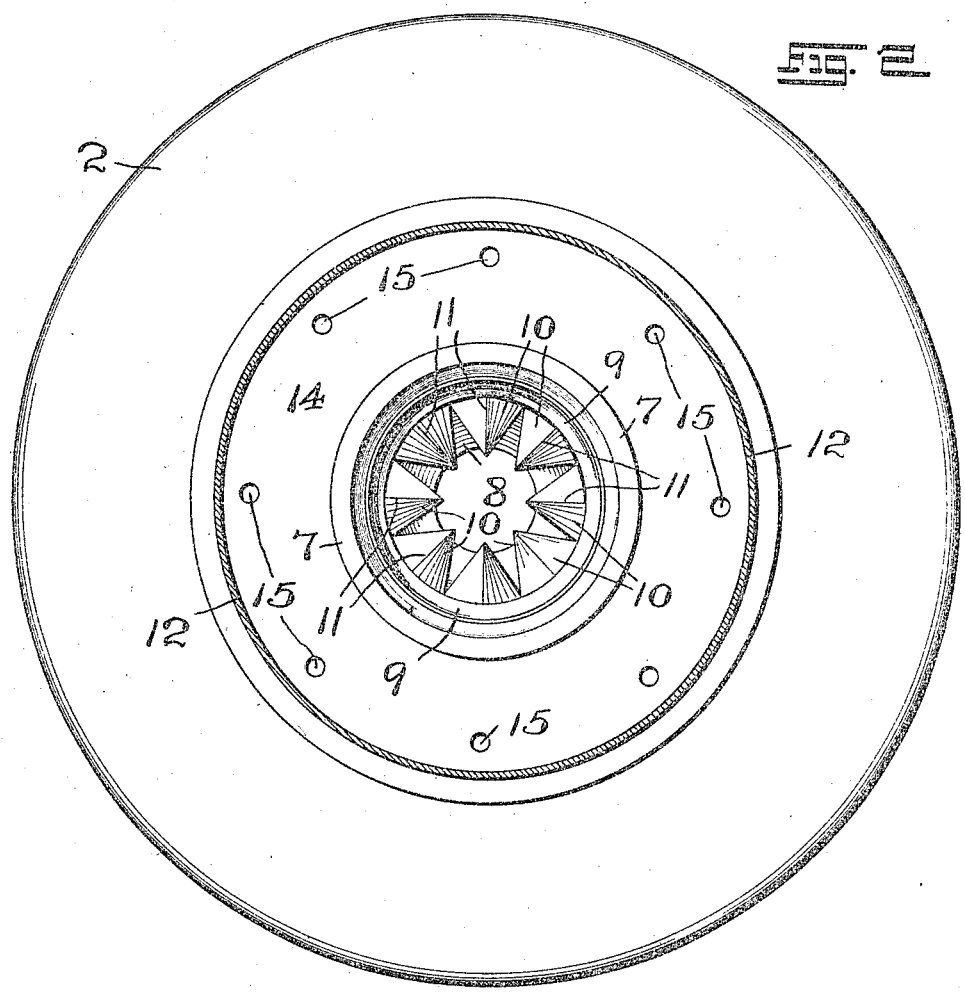
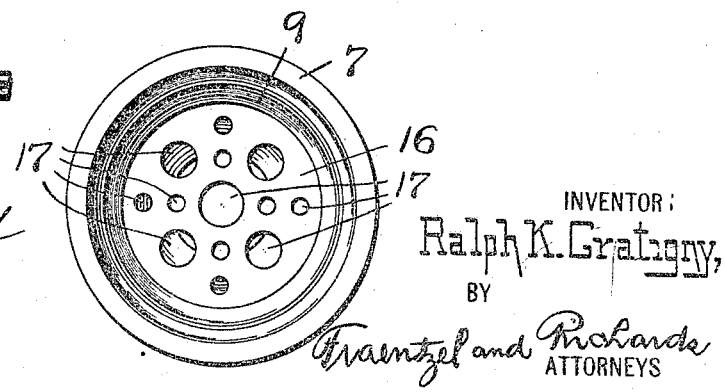
WITNESSES:
INVENTOR:
Ralph K. Gratigny,
BY
Fraentzel and Richards
ATTORNEYS

UNITED STATES PATENT OFFICE.

RALPH K. GRATIGNY, OF EDGEWATER, NEW JERSEY, ASSIGNOR OF ONE-HALF TO WILLIAM KELLEY, JR., OF NEWARK, NEW JERSEY, AND ONE-HALF TO WILLIAM D. TRUE, OF NEW YORK, N. Y.

ACETYLENE-GAS GENERATOR.

997,618.  Specification of Letters Patent.  Patented July 11, 1911.

Application filed December 18, 1909. Serial No. 533,746.

*To all whom it may concern:*

Be it known that I, RALPH K. GRATIGNY, a citizen of the United States, residing at Edgewater, in the county of Bergen and State of New Jersey, have invented certain new and useful Improvements in Acetylene-Gas Generators; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to an improvement in acetylene-gas generators; and, the present invention refers, more especially, to that class of acetylene gas-generators in which the carbid is fed, in required amounts, into a water-chamber as distinguished from the class of generators in which water is dropped upon the carbid.

The present invention has for its principal object to provide an acetylene gas generator which is constructed so as to be particularly adapted for use upon automobiles, launches, and all classes of moving vehicles, as well as for many other uses, wherein a portable acetylene gas-generator may be desired for the purpose of furnishing gas for illuminating purposes.

The invention has for its further object to provide a novel construction of acetylene gas-generator of the class above set forth, which may be subjected in its use to vibration, such for example as would necessarily follow its attachment upon a moving automobile, launch, or other moving vehicle, without interfering with its perfect operation. To this end, the present invention provides an acetylene gas-generator which, among other novel features, is provided with a novel construction of water-chamber or reservoir having connected therewith an anti-splash device or devices which prevents the water contained therein, when agitated by the vibration of the generator, from entering the carbid storage reservoir, or being splashed upon parts of the feed-mechanism for said carbid, whereby it could through capillary action, or otherwise get in contact with the carbid contained in said carbid storage reservoir, with perhaps dangerous or at least wasteful results.

A further object of the present invention is to provide a novel arrangement of carbid feeding mechanism which is automatically controlled by the pressure of the gas generated, so that the amount of gas generated is controlled by the amount of gas consumed; and, another object of the invention is to provide a novel construction of regulating valve through the operation of which the pressure of the gas which is delivered to the burner-locus is kept substantially uniform; and, furthermore, said regulating valve being so constructed and arranged that the amount of the gas so delivered to the burner-locus may be increased or decreased at will.

Another object of this invention is to provide in connection with the carbid feed mechanism and reservoir, a means whereby the said reservoir and feed mechanism may be sealed effectually against the entrance of vapor or moisture, when the supply of carbid is shut off automatically by the operation of the feed mechanism, or when the said generator is not in use.

Other objects of the present invention not at this time more particularly enumerated will be clearly understood from the following detailed description of my present invention.

With these various objects of my present invention in view, the said invention consists, primarily, in the novel construction of acetylene gas-generator hereinafter set forth; and, furthermore, this invention consists in the several novel arrangements and combinations of the various devices and parts, as well as in the details of the construction thereof, all of which will be hereinafter more fully described in the following specification, and then finally embodied in the clauses of the claims which are appended to and which form an essential part of this specification.

The invention is clearly illustrated in the accompanying drawings, in which:—

Figure 1 is a longitudinal vertical section of an acetylene gas-generator, embodying the principles of my present invention. Fig. 2 is a horizontal section of the acetylene gas-generator, taken on line 2—2 in said Fig. 1, looking in a downward direction, said view being made on an enlarged scale. Fig. 3 is a detail view of a slightly modified form of anti-splash device for use with the water-chamber or reservoir of the acetylene gas-generator.

Similar characters of reference are employed in all of the said hereinabove described views, to indicate corresponding parts.

Referring now to the several figures of the said drawings, the reference character 1 indicates the complete acetylene gas-generator showing one embodiment of the principles of the present invention, the same comprising a casing or container 2, of any desired shape, said casing providing a water-chamber or reservoir 3. The upper wall 4 of said casing or container 2 is provided with a suitably disposed opening or hole 5, and extending in a downward direction through said opening or hole 5 is a cylindrical sleeve 6 which is provided at its upper portion with a suitable flange 7, by means of which said sleeve 6 is supported or suspended upon the peripheral edge of the said opening or hole 5. Arranged within said cylindrical sleeve 6 is an anti-splash device, said device comprising a funnel-shaped shell 8 which is provided with a suitable flange 9, by means of which it may be suspended or supported within said cylindrical sleeve 6. Secured in the upper or flaring mouth-portion of said funnel-shaped shell 8 is a break-water, comprising a plurality of inwardly projecting pyramidically shaped lugs or projections 10, the upper faces of which slope or slant away from each side of a central radial line 11 which extends from base to apex of each lug 10. Secured upon the outer and upper surface of the upper wall 4 of said casing or container 2 is a dome-like shell 12 which is provided with a suitable opening 13 in its upper surface adapted to register above the opening or hole 5, and cylindrical sleeve 6 and its anti-splash device contained therein. This dome-like shell 12 being of considerably larger diameter than the diameter of said hole or opening 5 is adapted to form a splash-chamber 14 surrounding said hole or opening 5, as will be clearly evident. The wall 4 of said casing or container 2 is further provided with a plurality of small perforations 15 leading from said special chamber 14 back into said water-chamber or reservoir 3, so that any water which may wash or flow into the former may find its way back into the latter.

Referring now more particularly to Fig. 6 of the accompanying drawings, there is illustrated therein a slightly modified form of breakwater which may be arranged within the funnel-shaped shell 8 in place of the above described lugs or projections 10. This modified construction of breakwater, comprises a disk 16 which may be provided with a plurality of perforations 17 of varying sizes, if desired, the said disk 16 being secured in the upper or flaring mouth of said funnel-shaped shell 8.

Of course, it will be understood, that the form and shape of the breakwater device may be variously changed and still perform its function, hence I do not limit myself to the two preferable forms herein shown and described.

Secured in any suitable manner within the hole or opening 13 of said dome-like shell 12 is a neck-portion 18 which is provided with an annular screw-threaded extension 19.

The reference-character 20 indicates a tubular supporting member provided with a flange 21 at its upper portion upon which is permanently supported and secured, in any suitable manner, a casing 22. The lower end of said tubular supporting member 20 is provided with an inverted L-shaped flange or shoulder 23, and secured within the lower end of the said tubular supporting-member 20 is a ring or band 24 which forms a downwardly projecting apron, which, when the lower end of said tubular supporting member 20 is placed upon said neck-portion 18, projects thereunto. A suitable gasket 25 is arranged between the upper portion of said neck-portion 18 and said inverted L-shaped flange or shoulder 23, so as to form a gas-tight union. A screw-threaded lock-ring, as 26, provided with a flange 27 which bears upon the outer surface of said inverted L-shaped flange or shoulder 23, operatively engages with the screw-threaded annular extension 19 of said neck-portion 18 to bind the said tubular supporting member 20 to said neck-portion 18. The said casing 22 is provided at its lower end with a cone or funnel-shaped bottom portion 28, the same being provided with an opening or outlet 29 and which registers centrally with the opening or passage of said tubular supporting member 20. The top of said casing 22 is provided with a suitable closure or cover-member 30, secured thereto in any suitable manner. Arranged within the interior of said casing 22 is a suitable partition or member 31 which is provided with a centrally disposed opening or hole 32, and secured to the periphery of said opening or hole 32 of said partition or member 31, by means of a retaining ring 33 of suitable shape, and suitable bolts and nuts 34, is a flexible or distensible diaphragm 35, the same being made of rubber or other yieldable material impervious to the passage of gas therethrough. The said diaphragm 35 is further provided with a centrally disposed hole or opening, the periphery of which is formed with an upwardly extending shoulder 36 and a downwardly extending shoulder 37. Extending downwardly through said centrally disposed opening in said diaphragm 35 is a tubular portion 38, the same being provided at its upper portion with external screw-threads 39. The said diaphragm 35 is secured to the upper portion of said tubular-portion 38 by means of a pair of screw-threaded collars 40 and 41, between which the said diaphragm 35 is squeezed, said collars 40 and 41 being respectively provided with flanges 42 and 43 which are made to conform with and receive, respectively, the shoulders 36 and 37 which surround the said centrally disposed opening of said diaphragm 35, this means for securing the said diaphragm 35 to said tubular portion 38 preventing said diaphragm from pulling away from said tubular portion when the former is distended, and furthermore providing a gas-tight joint between said diaphragm and said tubular portion, as will be clearly evident. Secured upon the upper and free end of said tubular portion 38 is a perforated screw-cap 44. Suitably secured and arranged in connection with the said closure or cover-member 30 of said casing 22 is a stationary bushing 45, and operatively arranged in said bushing 45 is a screw-threaded shank 46 provided with a head, as 47, which projects above the outside of said closure or cover-member 30. The lower or inwardly projecting end of said screw-threaded shank 46 is provided with a stem 48 which extends downwardly through the perforation of said screw-cap 44, said stem being finished with a head or shoulder 49 which engages with the inner and under surface of said screw-cap 44. Arranged around said screw-threaded shank 46 and its stem 48, between said stationary nut-piece 45 and said screw-cap 44, is a coiled spring 50, which is arranged so as to exert a downward thrust upon said screw-cap 44 and the tubular portion 38. Secured to the lower end of said tubular portion 38, by means of a transverse pin 51, or any other suitable fastening means, is the head 52 of a gate-stem 53, said stem 53 being further provided with an enlarged cylindrical portion 54 which normally resides within the opening or outlet 29 of the cone or funnel-shaped bottom-portion 28 of said casing 22, and acts as a gate or closure therefor. The said gate-stem 53 terminates in a cone-shaped valve-member 55, the chamfered surface of which is provided with a washer or gasket 56. Secured by means of its flange 57 to the bottom portion 28, and extending downwardly within said tubular supporting member 20, is an apron 58, and secured within said apron 58, in any suitable manner, is a cone-shaped member 59 which is provided at its lower or free end with a flaring flange 60 which corresponds in its angle of deflection with the slant of the sides of said cone-shaped valve-member 55, and is thus adapted to serve as a seat for said valve-member. The space 61 between the diaphragm 35 and the bottom portion 28 within said casing 22, serves as a carbid-container or reservoir adapted to receive and store therein a quantity of carbid 62. A duct 63 which extends downwardly through said closure or cover-member 30, and through said partition-member 31, serves as a means for replenishing the said carbid container or reservoir 61 with carbid. The outwardly projecting end of said duct 63 is provided with a screw-thread whereby the screw-threaded cap or closure 64 may be secured thereto for the purpose of closing said duct. The said casing 22 is provided at a point below the line of said partition or member 31 and the diaphragm 35, with a receiving member 65. A cylindrical barrel 67 provided with a cap 69 is secured in said receiving member 65. Said cylindrical barrel is provided with a reducing shoulder 71 and a tubular extension 72 from which extends a filter barrel upon which is secured a filter fabric 77 by means of the retainer rings or wires 78. The closure or cover-member 30 of said casing 22 is provided with a suitable hole or opening 82, and extending into and through said hole or opening 82 is the outlet of a pressure regulating valve 83, the latter being provided with a shoulder 84 and a screw-threaded portion 85 upon which is arranged the retaining nut 86. Extending upwardly from said screw-threaded portion 85 is a gas outlet nozzle 87. Said regulating valve 83 is provided with a ring 93 for supporting a diaphragm. A gas-pipe or conduit 103, connects said barrel 67 of the filter device with said pressure regulating valve 83. A fulcrum block 107 is secured to said casing 22 beneath said pressure regulating valve 83, and a bell-crank lever 108 is pivoted thereto, the latter being provided with a seat 109 upon which rests a tension spring 111, the opposite end of which bears against the nut 97 of a diaphragm stem connected with said pressure regulating valve 83. Said bell-crank lever 108 is provided with a downwardly extending arm 116 against which abuts the end of a regulating screw 112 provided with a manipulating head 114. The said bell-crank lever 108 and adjusting screw 112 tend to increase or decrease, as desired, the pressure of said spring 111 upon the diaphragm of said pressure regulating valve whereby it may be regulated to increase or decrease the volume of gas flowing through or out of said pressure regulating valve 83.

Having thus described in detail the general construction of my novel form of acety- lene gas-generator, I will briefly set forth its operation in generating the acetylene gas.

The water-chamber 3 is filled with water, the level of said water rising through said funnel-shaped shell 8 until it covers the said break-water device formed by the projections 10. By means of this arrangement, a small proportion of the water is maintained at a point accessible to the falling carbid. The quantity of water, thus exposed, is so small that under the action of vibration or the unstable movements to which the generator may be subjected, when in use, the agitation thereof is not accompanied with great or heavy splashings; the break-water device tending further to prevent sudden and spasmodic splashing or upheaval of the water from the main reservoir. Whatever slight agitation of the small quantity of water may result in the funnel shaped shell 8, expends itself in the splash-chambers 14, and does not rise and is not thrown up into the tubular supporting member 20, where it could come in contact with the feed-mechanism, and by capillary action, or otherwise, work its way into the carbid container, where it would act upon the carbid tending to cake the same and prevent its proper feeding. Any splash or agitation of the water, which might take place, is in lateral lines and not in vertical lines, hence the splash-chambers 14 will catch the same. As a further precaution the apron 58 is caused to surround the exposed portions of the feed-mechanism. The carbid chamber being supplied with carbid, preferably in small granular form, or in small aggregated crystals, the generator is ready for operation.

When the generator is not in use the screw-shank 46 is screwed upwardly so that the head 49 bears upon the cap 44 and thereby exerts an upward pull upon the feed-mechanism, so that the gate 54 closes the carbid outlet 29; and, furthermore, draws up the valve 55 so that it tightly fits upon the seat 60 and seals the opening against the passage therethrough of gas or vapor. When it is desired to start the generator, the screw-shank 46 is screwed downwardly, leaving the spring 50 free to act, so that the same presses down the feed-mechanism and forces the gate 54 downwardly, whereby the outlet 29 is opened to the passage of carbid therethrough, and at the same time opens the valve-member 55, so that the carbid drops into the water. The gas being generated by the contact of the carbid with the water, rises and presses through the open feed-mechanism into the space 61, and then passes through said filter-device and pressure-regulating valve 83 to the gas outlet nozzle 87.

I am aware that changes may be made in the various arrangements and combinations of the several devices and parts and in the features of my present invention without departing from the scope thereof, as described in the foregoing specification, and as defined in the claims which are appended thereto. Hence, I do not limit my invention to the exact arrangements and combinations of the various devices and parts as herein set forth in the said specification, and as illustrated in the accompanying drawings, nor do I confine myself to the exact details of the construction of the said parts.

I claim:—

1. In an acetylene gas generator, the combination with a carbid-container, of means for supporting and connecting the same above a water-container, means for feeding the carbid into the water in said water-container, said water-container being provided with a suitably disposed opening in its upper wall, a dome-like shell forming a splash-chamber arranged above said opening, said upper wall of said water-container being provided with suitably disposed holes or perforations leading from said splash-chamber into said water-container, and means arranged within said opening of said water-container for segregating a quantity of water from the main supply in said water-container, comprising a cylindrical sleeve suspended from said opening within said water-container, a funnel-shaped shell supported within said cylindrical sleeve, and a break-water device arranged within the flaring upper end of said funnel-shaped shell below the normal water-level of said water-container, substantially as and for the purposes set forth.

2. In an acetylene gas generator, the combination with a carbid-container, of means for supporting and connecting the same above a water container, means for feeding the carbid into the water in said water-container, said water-container being provided with a suitably disposed opening in its upper wall, a dome-like shell forming a splash-chamber arranged above said opening, said upper wall of said water-container being provided with suitably disposed holes or perforations leading from said splash-chamber into said water-container, and means arranged within said opening of said water-container for segregating a quantity of water from the main supply in said water-container, comprising a cylindrical sleeve suspended from said opening within said water-container, a funnel-shaped shell supported within said cylindrical sleeve, and a break-water device arranged within the flaring upper end of said funnel-shaped shell below the normal water-level of said water-container, comprising a plurality of inwardly projecting pyramidical shaped lugs, substantially as and for the purposes set forth.

3. In an acetylene gas generator, the combination with a carbid-container, of means for supporting and connecting the same above a water-container, means for feeding the carbid into the water in said water-container, said water-container being provided with a suitably disposed opening in its upper wall, a dome-like shell forming a splash-chamber arranged above said opening, said upper wall of said water-container being provided with suitably disposed holes or perforations leading from said splash-chamber into said water-container, and means arranged within said opening of said water-container for segregating a quantity of water from the main supply in said water container, comprising a cylindrical sleeve suspended from said opening within said water-container, a funnel-shaped shell supported within said cylindrical sleeve, and a break-water device arranged within the flaring upper end of said funnel-shaped shell below the normal water level of said water-container, comprising a plurality of inwardly projecting pyramidical shaped lugs, the upper faces of which slant downwardly from each side of a central radial line thereof, substantially as and for the purposes set forth.

4. In an acetylene gas generator, the combination with a carbid-container provided with a carbid outlet, of a distensible diaphragm arranged within said carbid-container, a centrally disposed tubular portion connected with said diaphragm, a gate-stem secured to the lower end of said tubular portion, a gate or closure upon said gate-stem for closing said carbid-outlet, a cylindrical apron connected with the bottom of said carbid-container and surrounding said carbid-outlet, a cone-shaped member provided at its lower end with a flange forming a valve-seat arranged within said cylindrical apron, and a conical valve-member provided with a resilient covering connected with the lower end of said gate-stem adapted to be brought in engagement with said valve-seat, said gate or closure and said valve-member moving simultaneously in their opening and closing movements, substantially as and for the purposes set forth.

5. In an acetylene gas generator, the combination with a carbid-container provided with a carbid-outlet, of a distensible diaphragm arranged within said carbid-container, a centrally disposed tubular portion connected with said diaphragm, a gate-stem secured to the lower end of said tubular portion, a gate or closure upon said gate-stem for closing said carbid-outlet, a cylindrical apron connected with the bottom of said carbid-container and surrounding said carbid-outlet, a cone-shaped member provided at its lower end with a flange forming a valve-seat arranged within said cylindrical apron, and a conical valve-member provided with a resilient covering connected with the lower end of said gate-stem adapted to be brought in engagement with said valve-seat, said gate or closure and said valve-member moving simultaneously in their opening and closing movements, and means for drawing and retaining said gate or closure and said valve-member in their closed relations respectively with said carbid-outlet and said valve-seat, substantially as and for the purposes set forth.

6. In an acetylene gas generator, the combination with a carbid-container provided with a carbid-outlet, a cover-member connected with said carbid container, a centrally disposed stationary nut-piece connected with said cover-member, a distensible diaphragm arranged within said carbid-container, a centrally disposed tubular portion connected with said diaphragm, a perforated screw-cap upon the upper end of said tubular member, a screw-threaded shank arranged in said nut-piece of said cover-member, an extension shank provided with a head adapted to operatively engage the screw-cap of said tubular portion at proper times, a coiled spring arranged between said screw-cap and said cover-member, a gate-stem secured to the lower end of said tubular portion, a valve-seat arranged beneath said carbid outlet, a cylindrical apron surrounding said valve-seat, a gate or closure for closing said carbid-outlet connected with said gate-stem, and a valve-member adapted to be seated upon said valve-seat, said gate or closure and said valve-member being operated simultaneously in their opening and closing movements, substantially as and for the purposes set forth.

7. In an acetylene gas generator, the combination with a carbid container provided with a carbid outlet, a cover-member connected with said carbid container, a centrally disposed stationary nut-piece connected with said cover-member, a distensible diaphragm arranged within said carbid-container, a centrally disposed tubular portion connected with said diaphragm, a perforated screw-cap upon the upper end of said tubular member, a screw-threaded shank arranged in said nut-piece of said cover-member, an extension shank provided with a head adapted to operatively engage the screw-cap of said tubular portion at proper times, a coiled spring arranged between said screw-cap and said cover-member, a gate-stem secured to the lower end of said tubular portion, a gate or closure upon said gate-stem for closing said carbid-outlet, a cylindrical apron connected with the bottom of said carbid-container and surrounding said carbid-outlet, a cone-shaped member provided at its lower end with a flange forming a valve-seat arranged within said cylindrical apron, and a conical valve-member provided with a resilient covering connected with the lower end of said gate-stem adapted to be brought in engagement with said valve-seat, said gate or closure and said valve-member moving simultaneously in their opening and closing movements, substantially as and for the purposes set forth.

In testimony, that I claim the invention set forth above I have hereunto set my hand this 15th day of December, 1909.

RALPH K. GRATIGNY.

Witnesses:
GEORGE D. RICHARDS,
MAYBELLE McADOO.